April 9, 1968 D. S. WILSON 3,377,113
HYDRODYNAMIC BEARING
Filed Aug. 3, 1965 2 Sheets-Sheet 1
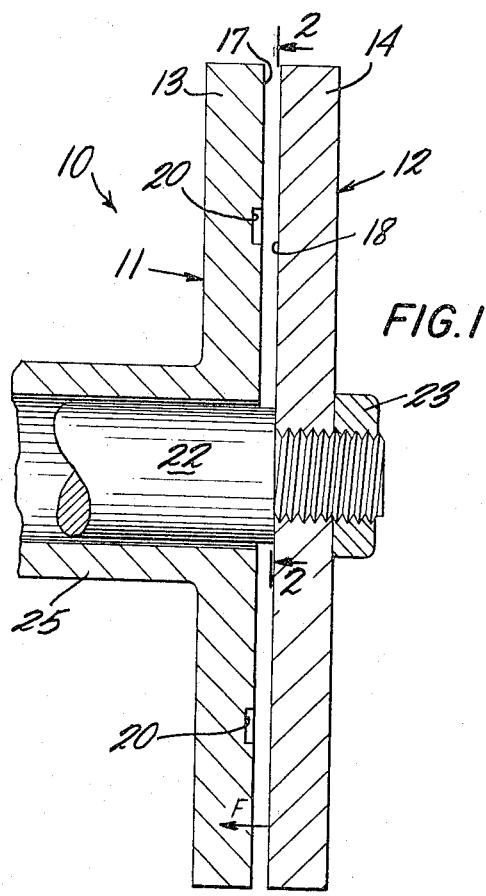
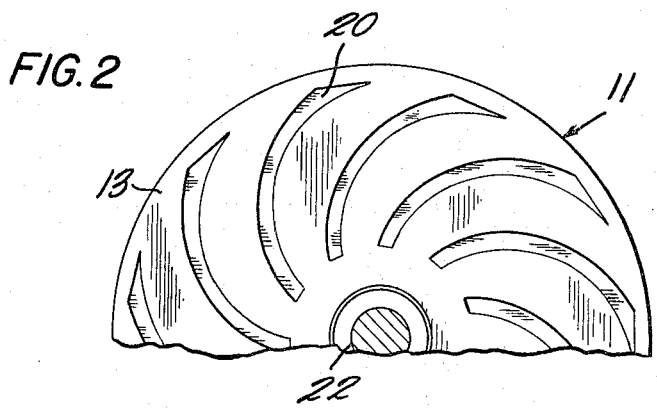
INVENTOR.
DONALD S. WILSON
BY Brumbaugh, Free,
Graves & Donohue
his ATTORNEYS

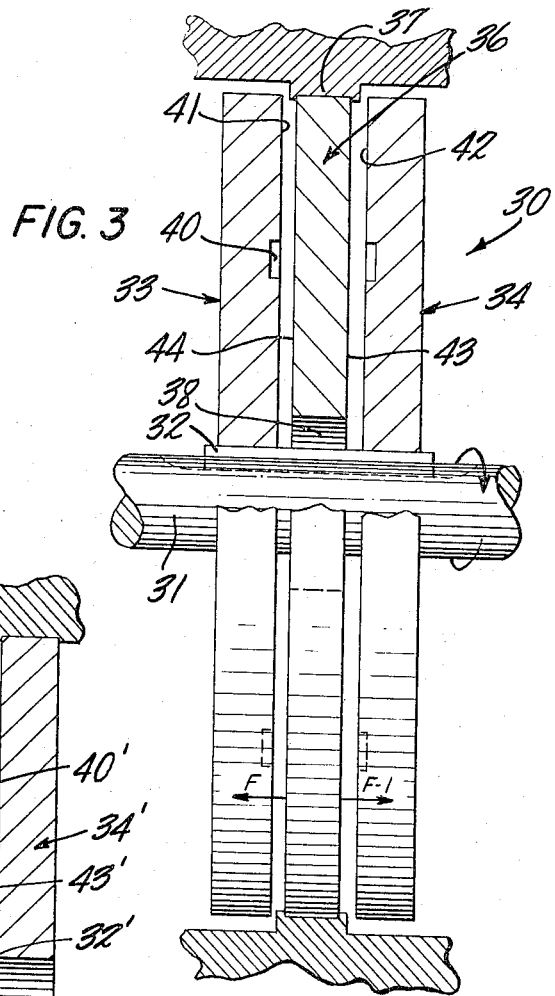
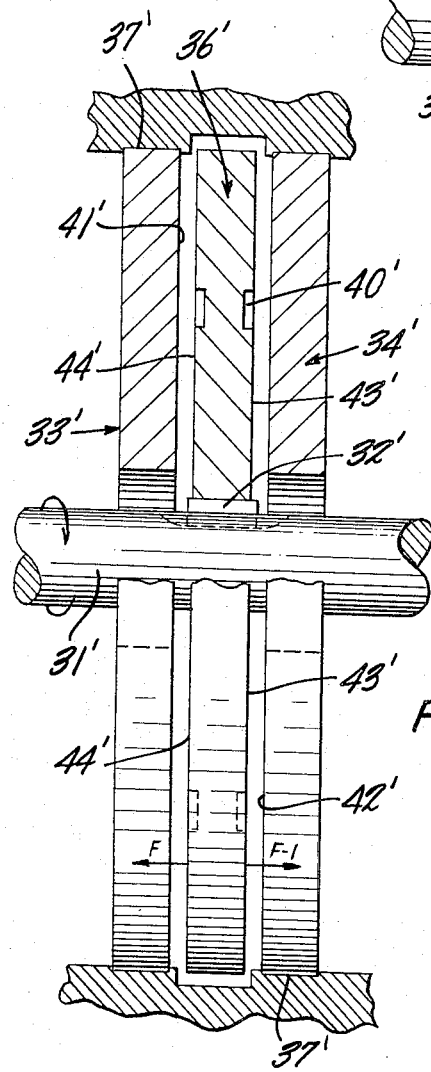
FIG. 3
FIG. 4
INVENTOR.
DONALD S. WILSON
his ATTORNEYS

United States Patent Office 3,377,113
Patented Apr. 9, 1968

3,377,113
HYDRODYNAMIC BEARING
Donald S. Wilson, West Hurley, N.Y., assignor to Rotron Manufacturing Company, Inc., Woodstock, N.Y., a corporation of New York
Filed Aug. 3, 1965, Ser. No. 476,879
8 Claims. (Cl. 308—10)

ABSTRACT OF THE DISCLOSURE

This improvement relates to the prevention of metal-to-metal contact in a hydrodynamic bearing during starting and stopping thereof, when the motion of the bearing is insufficient to establish a load supporting film, through the utilization of magnetic means incorporated in the bearing surfaces for developing a repulsive force sufficient to maintain a clearance between the bearing surfaces.

---

The present invention relates to hydrodynamic bearings and, more particularly, to improved bearings of the type providing long operative life, requiring low starting torques, and eliminating stopping and starting wear with its attendant problems.

Hydrodynamic bearings rely upon the relative movement between members to establish a load-supporting lubricating film between the bearing surfaces, and the lubricants used with such bearings need have no load-supporting capability when no rotation is taking place. Consequently, low viscosity lubricants such as water, steam, acids, mercury, and gases have been used with hydrodynamic bearings.

Although gases provide a somewhat lower load-carrying capacity than other more viscous lubricant agents, gas bearings (utilizing, for example, air) have been extensively employed in high speed rotating devices, inasmuch as once the relative velocity between the bearing surfaces reaches a value sufficient to establish and maintain a load-supporting film, the operation of the bearing is virtually friction free due to the low viscosity of air.

In such bearings, when the relative velocity between the bearing surfaces is insufficient to establish a load-supporting film, e.g. during starting, stopping, or reversing, contact between the bearing surfaces will occur, causing wear on the bearing surfaces and increased frictional drag. In applications requiring frequent stopping and starting or where starting torques must be minimized, contact between the bearing surfaces is of particular concern.

The usual hydrodynamic bearing is fabricated of an extremely hard, wear-resistant material, such as one of several hardened steel alloys now available, and is machined to extremely close tolerances and smooth surface finishes. Although such bearings are able to resist contact wear to a certain extent, they still have a relatively limited life, especially where they are subject to frequent starting and stopping, and are costly to manufacture.

Therefore, it is the primary object of this invention to provide an improved hydrodynamic bearing construction which overcomes the shortcomings of existing bearings of this type.

It is a further object of the invention to provide an improved hydrodynamic thrust bearing in which wear and starting torque may be reduced.

It is an other object of the invention to provide hydrodynamic thrust bearings having magnetic means to eliminate the contact between the actual bearing surfaces upon starting and stopping, and under all conditions, when the relative movement between the bearing surfaces is insufficient to establish a load-supporting film.

A practical solution to this problem is set forth in my copending application Ser. No. 454,821, filed May 11, 1965, now abandoned and involves maintaining a minimum clearance between the bearing surfaces, even when their relative velocity is insufficient to establish a load-supporting film. Mechanical means, such as rollers or a small area projection from the bearing surfaces provide the minimum separation between the bearing surfaces and serve to absorb the starting and stopping wear, at the same time, reducing torques. The present invention is a modification of my earlier devices, employing magnetic rather than mechanical means to maintain the minimum clearance.

Briefly, in accordance with the invention, magnetic means are provided to maintain the bearing surfaces of the relative rotating members, out of contact, under all conditions, whenever the relative movement between the bearing surfaces is insufficient to establish a load-supporting film.

In one form of the invention, a thrust bearing has each of its thrust faces fabricated, either wholly or partially, of a permanent magnet material, polarized to develop a repulsive force sufficient to maintain a clearance between the bearing surfaces whenever the bearing members are at rest or at operating speeds insufficient to establish a load-supporting film.

Another embodiment, adapted to carry thrust loads applied in both thrust directions employs either a stationary magnetic member spatially located between two rotating members or a single rotating member disposed between a pair of stationary members. In this arrangement, the central member is provided with two bearing surfaces, each of which is adapted to cooperate with a bearing surface provided on a separate outer member, so that when the relative motion between a respective rotating member and the stationary member is above a predetermined speed, it establishes a load-supporting film.

Each of the members is composed at least in part of a permanent magnet material, the polarity of which is arranged to develop a separate repelling force between each outer member and the central member. The repelling forces developed between the respective pairs of magnetic surfaces are directed in opposing senses so that when no unbalancing thrust load is applied, these forces counterbalance each other. However, when a thrust load is applied in one direction, the magnetic repelling force opposing the load increases, whereas the repelling force in the other direction decreases. Hence, a restoring force is developed which opposes the thrust load. By properly selecting magnetic flux levels, a clearance may be maintained whenever the bearing surfaces are at rest or operating at speeds insufficient to establish a load-supporting film.

For a more complete understanding of the invention, reference may be had to the following description taken in conjunction with the figures of the accompanying drawing, in which:

FIGURE 1 is a sectional view of an embodiment of the invention as applied to one form of thrust bearing;

FIGURE 2 is a sectional view taken along line 2—2 of FIGURE 1;

FIGURE 3 illustrates the invention as applied to another form of thrust bearing adapted to support thrust loads in either direction parallel to an axial path; and FIGURE 4 illustrates still another embodiment adapted to support thrust loads in an axial manner.

For the sake of clarity of the illustration, the clearance between the bearing surfaces shown in the drawing has been greatly exaggerated. In actual practice, the clearance in hydroyamic bearings, employing air as a lubricant, may be of the order of from .001 to .003 inch, depending on the size of the members and the loads to be supported.

The embodiment of FIGURES 1 and 2 illustrates the invention as applied to a hydrodynamic thrust bearing utilizing a gas, such as air, as the lubricant. The thrust bearing 10 is provided with two members 11 and 12, providing thrust plates 13 and 14, having closely spaced flat facing bearing surfaces 17 and 18, respectively. Bearing surface 17, formed on member 13, is provided with shallow pumping grooves 20, formed therein to aid in the establishment of the hydrodynamic film. A number of groove designs are currently in use to develop load-supporting films which include (a) spiral grooves (inward or outward pumping grooves), (b) herringbone grooves, (c) tapered sector, (d) stepped sector, and (e) pivoted sector. The choice of any particular groove design depends upon varying considerations such as load capacity, stability, fabrication cost, and accuracy of fabrication and both surfaces 17 and 18 may be grooved if desired.

As shown, the member 12 is rigidly fixed to the end of a shaft 22 by a threaded fastener 23, and the member 11 is integrally formed with a sleeve 25 which surrounds the shaft 22. Either the shaft 22 or the sleeve 25 may be made to rotate while the other member is held stationary. It will be understood, therefore, although not shown, that there is a journal bearing between the sleeve 25 and the shaft 22, which may be of any conventional variety.

Both of the surfaces 17 and 18 are formed at least in part of a permanent magnet material, with materials on each surface polarized so as to generate a repulsive force tending to keep the surfaces apart. The magnetic material may be in the form of inserts in the bearing face, a layer covering the entire bearing face, or the plate 17 or 18 may be entirely fabricated of the magnetic material. For convenience, the bearing members in this embodiment, as well as those of FIGURES 3 and 4, are shown to be completely of the magnetic material.

In operation, when the members 11 and 12 are rotated relative to one another, such as by a motor, at a velocity sufficient to establish a load-supporting film, both the members 11 and 12 will be spaced apart from one another by the film. However, at rest, stopping, starting, or reversing, when the relative movement between the bearing surfaces 17 and 18 is insufficient to develop a load-supporting film, the magnetic repelling force developed between the surfaces 17 and 18 is sufficient to counteract the normal thrust load tending to bring the surfaces into contact.

The repulsive force developed between the magnetic bearing surfaces is proportional to the flux in the gap between the bearing members and the area of the magnetic bearing surface. When air is employed as the lubricant, as is quite common, the repulsive force developed between the bearing surfaces may be approximately expressed by the equation:

$$F = 0.577 \times 10^{-6} B_g^2 A_g \text{ lbs.} \quad (1)$$

where $B_g$ is the air gap flux in Gauss and $A_g$ is the air gap area in square inches. Actually, a certain amount of flux leakage is unavoidable and the constant may vary somewhat, depending upon the environment in which the bearing is used. Leakage can be reduced by magnetically shielding the bearing elements.

In general, Equation 1 indicates that the thrust force that the magnetic system is capable of supporting can be increased simply by increasing the magnetic area of the bearing. However, increasing the magnetic area also increases the mass of the bearing elements and greater forces will be required to support and drive the bearing elements. Therefore, a balance must be struck between these two parameters, depending upon the particular application.

The other independent variable in Equation 1 is the magnetic flux in the air gap. Various magnetic materials are available which appear able to provide the flux requirement, but when placed in a demagnetizing field, such as provided by a similar magnetic material oriented to establish a repelling force, they demagnetize rapidly. It has been found that a barium oxide, ferric oxide compound of the approximate atomic formula $BaO \cdot 6Fe_2O_3$ exhibits a high degree of resistance to demagnetization under these conditions and is well suited to use in the hydrodynamic bearings of the present invention. This material has a very high coercive force and almost a straight line demagnetization curve which results in smaller change in flux for a given change in demagnetization influence than other materials. Moreover, this material exhibits a high degree of dimensional and temperature stability and is therefore able to sustain the repulsive force over a wider range of operating conditions.

The spring rate or stiffness developed by a pair of opposed magnetic surfaces is relatively low and such surfaces are incapable of supporting appreciable dynamic loads by themselves. However, when combined with the hydrodynamic pumping face described above, an appreciable load-supporting capability is developed. During operation, as the magnetic bearing surfaces approach one another under dynamic thrust loads, the hydrodynamic film developed between the bearing surfaces will augment the magnetic force and support the load.

In one workable arrangement in accordance with FIGURE 1, the magnetic force was such as to produce a static spacing between the surfaces of from 0.005 and 0.025 inch. As rotational speed increased, the thrust load did also, moving the surfaces towards one another. At the same time, however, the hydroynamic film was established, and as the gap descreased to within 0.001 to 0.003 inch, the full load supporting capacity of the hydrodynamic film was reached. Thus, during starting and stopping, the bearing surfaces are maintained out of contact by the magnetic forces, while at operational speeds, a hydrodynamic film is established to provide an increased load supporting capability.

In the construction shown in FIGURE 3, the thrust bearing is adapted to support thrust loads in either direction along the path, defined by the axis of rotating shaft member 31. Keyed at 32 to the shaft 31 are two thrust plate members 33 and 34. A stationary thrust plate member 36, fixed at 37 to any suitable frame member, is interposed between and spaced from the two rotating members 33 and 34. A bore 38 of greater diameter than the shaft 31 permits the shaft to pass therethrough without interference between the shaft and the member. To establish the hydrodynamic films, pumping grooves 40 are provided in the flat bearing surfaces 41 and 42 of each of the rotary mounted members, respectively. The respective complementary surfaces 43 and 44 are shown without grooves, although they also may be grooved.

All three members 33, 34, and 36 have opposing surfaces formed of a permanent magnetizable material, such as a barium oxide compound, ferric oxide, as described above, the polarity of which is so chosen that in the rest condition, equal repulsive forces, "F" between the members 33 and 36 and "F-1" between the members 34 and 36, are developed. These forces tend to maintain the rotating members 33, 34 equally spaced from the fixed member 36 while at rest.

During operation when a thrust force or load is applied in one direction, say, for example, toward the right as shown in FIGURE 3, then the magnetic repulsive force "F" increases while the magnet repulsive force "F-1," developed between the bearing surfaces 42 and 43, decreases. In effect, this action creates a restoring force opposing the axial thrust force. A similar restoring force is developed between the surfaces 41 and 44 when the thrust load is applied to the left, as seen in the drawing. The establishment of the hydrodynamic film occurs between either pair of bearing surfaces, as described in connection with FIGURE 1.

The construction shown in FIGURE 4 illustrates a thrust bearing quite similar to the embodiment of FIG- URE 3. Here, however, the rotataing member 36' is keyed at 32' to the shaft 31' and is centrally disposed between two fixed plates 33' and 34'. As in the arrangement of FIGURE 3, the pumping grooves 40' are provided in the rotating element. With this embodiment, if an unbalanced force is directed toward the left, as shown in the view, then the repulsive force "F-1" created between the surfaces 42' and 43' increases, whereas the repulsive force "F" developed between the surfaces 41' and 44' decreases substantially, urging the shaft 31' and the member 36' carried back thereby to a normal balanced position, whereby the repulsive forces developed between each of the surfaces are equal.

Many modifications and variations of the structures illustrated will readily occur to those skilled in the art. For example, in all the embodiments shown, permanent magnetic material is employed in the thrust members. However, in lieu thereof, electro-magnets may also be provided and so energized that once the hydrodynamic load-supporting film develops, the electro-magnets would be de-energized inasmuch as the basic function of separating the parts by these magnets has been accomplished. Further, various shielding arrangements may be provided to reduce the flux leakage between the thrust members, such as by means of a cylindrical member disposed about the outer periphery of the thrust members. Therefore, all modifications and variations are included within the scope of the invention as defined by the following claims.

I claim:

1. In a hydrodynamic bearing including a pair of relatively rotatable members having respective cooperating bearing surfaces between which is developed a load-supporting film upon relative motion above a predetermined speed, the improvement comprising magnetic means developing a repulsive force sufficient to maintain a clearance gap between said bearing surfaces when the relative speed of rotation is insufficient to establish said load-supporting film.

2. The improvement set forth in claim 1 wherein said magnetic means includes at least a portion of each of said members formed of a permanently magnetic material, the respective portions having opposing polarities adapted to develop said repulsive force.

3. A hydrodynamic thrust bearing comprising a pair of generally flat opposing surfaces defining the bearing, at least one of said surfaces including pumping grooves, said surfaces being rotatable relative to each other to establish a load-supporting film between said surfaces at a predetermined rotational speed and each being formed at least in part of a magnet having a polarity to create a repulsive force between said surfaces of sufficient magnitude to maintain a clearance between the surfaces when the relative speed between said surfaces is insufficient to establish a load-supporting film.

4. A hydrodynamic thrust bearing as in claim 3 wherein said magnets are formed of permanently magnetic material.

5. A hydrodynamic thrust bearing as in claim 4 wherein said magnets are formed of a barium oxide, ferric oxide composition having the approximate formula $BaO.6Fe_2O_3$.

6. A hydrodynamic thrust bearing comprising a first bearing member having bearing surfaces on opposite sides thereof, second and third members each having one bearing surface disposed in bearing relationship to a respective side of said first bearing members, said members being relatively rotatable to establish load-supporting films between the respective pairs of facing bearing surfaces at a predetermined rotational speed, said bearing surfaces being formed at least in part of magnetic material and having polarities to create repulsive forces between the surfaces of each of said pairs sufficient to maintain a clearance between said surfaces when the rotational speed is insufficient to establish said load-supporting film.

7. A hydrodynamic thrust bearing comprising a stationary magnet member having a first support surface and a second support surface, a first rotatable magnet member having a first support surface co-operable with said first stationary surface, a second rotatable magnet member having a second support surface co-operable with said second stationary surface, said magnet members being rotatable relative to each other to establish a load-supporting film between said co-operating surfaces at a predetermined rotational speed, said magnet members being formed of magnetic material of polarities creating a repulsive force between said first surfaces and a repulsive force between said second surfaces sufficient to maintain a clearance between said co-operating surfaces when said relative speed of rotation is insufficient to establish said load-supporting film.

8. A hydrodynamic thrust bearing comprising a first stationary magnet member having a support surface, a second stationary magnet member having a second support surface, a rotatable magnet member having a first support surface co-operable with said first stationary surface and a second support surface co-operable with said second stationary surface, said magnet members being rotatable relative to each other to establish a load-supporting film between said co-operating surfaces at a predetermined rotational speed, said magnet members being formed of magnetic material of polarities creating a repulsive force between said first surfaces and a repulsive force between said second surfaces sufficient to maintain a clearance between said co-operating surfaces when said relative speed of rotation is insufficient to establish said load-supporting film.

References Cited

UNITED STATES PATENTS

| 2,747,944 | 5/1956 | Baermann | 308—10 |
| 3,232,680 | 2/1966 | Clark | 308—9 |
| 3,282,633 | 11/1966 | Moors | 308—9 |

MARTIN P. SCHWADRON, *Primary Examiner.*

FRANK SUSKO, *Examiner.*